United States Patent [19]

Blaya et al.

[11] Patent Number: 4,497,904
[45] Date of Patent: Feb. 5, 1985

[54] CATALYSTS FOR THE POLYMERIZATION AND COPOLYMERIZATION OF ETHYLENE AND POLYMERIZATION PROCESSES USING THESE CATALYSTS

[75] Inventors: Alain Blaya; Pierre Crouzet, both of Martigues; Stylianos Sandis, Lavera; Jean C. Bailly, Martigues, all of France

[73] Assignee: BP Chimie Societe Anonyme, Paris, France

[21] Appl. No.: 504,985

[22] Filed: Jun. 16, 1983

[30] Foreign Application Priority Data

Jun. 24, 1982 [FR] France .................. 82 11055
Jun. 24, 1982 [FR] France .................. 82 11053

[51] Int. Cl.$^3$ ............................................. C08F 4/02
[52] U.S. Cl. ........................... 502/104; 502/110; 502/115; 502/121; 502/122; 502/123; 502/128; 502/132; 502/134; 502/153; 502/154; 502/162; 502/167; 502/168; 502/169; 502/226; 502/126; 526/225
[58] Field of Search ............. 502/226, 169, 153, 154, 502/162, 167, 168, 104, 110, 115, 132, 134, 126, 121, 122, 123, 128

[56] References Cited

U.S. PATENT DOCUMENTS

| | | | |
|---|---|---|---|
| 3,135,809 | 6/1964 | Bosmajian | 502/114 X |
| 4,220,554 | 9/1980 | Scata et al. | 502/119 |
| 4,250,288 | 2/1981 | Lowery et al. | 502/128 X |
| 4,252,670 | 2/1981 | Caunt et al. | 502/110 |
| 4,314,912 | 2/1982 | Lowery et al. | 502/128 X |
| 4,329,253 | 5/1982 | Goodall et al. | 502/111 |
| 4,364,851 | 12/1982 | Shiga et al. | 502/169 X |
| 4,399,054 | 8/1983 | Ferraris et al. | 502/154 |
| 4,414,132 | 11/1983 | Goodall et al. | 502/169 |

FOREIGN PATENT DOCUMENTS

| | | |
|---|---|---|
| 24933 | 3/1981 | European Pat. Off. . |
| 2014887 | 4/1970 | France . |
| 2143346 | 2/1973 | France . |
| 1580635 | 12/1980 | United Kingdom . |

Primary Examiner—Patrick Garvin
Attorney, Agent, or Firm—Brooks, Haidt, Haffner & Delahunty

[57] ABSTRACT

The present invention relates to catalysts for the polymerization and copolymerization of ethylene, characterized in that they comprise a support based on magnesium chloride and possibly on aluminium chloride, of spheroidal shape, having a mean diameter by mass comprised between 10 and 100 microns and with a narrow particle size distribution, such that the ratio of the mean diameter by mass to the mean diameter by number is less than or equal to 3, on which support there has been precipitated a derivative of a transition metal of groups IV, V and VI of the Periodic Table of Elements, and a polymerization process utilizing the said catalysts.

13 Claims, No Drawings

CATALYSTS FOR THE POLYMERIZATION AND COPOLYMERIZATION OF ETHYLENE AND POLYMERIZATION PROCESSES USING THESE CATALYSTS

The present invention relates to new catalysts for the polymerisation and copolymerisation of ethylene and processes using these catalysts.

It is known that catalysts for polymerising and copolymerising alpha-olefins, known as "Ziegler-Natta" catalysts, are obtained by the combination of transition metal compounds belonging to Groups IV, V or VI of the Periodic Table of Elements, with at least one organometallic compound of Groups I to III of this Table.

It is known furthermore that the properties of these catalysts may be strongly affected when the said transition metal compound is used with a solid mineral compound which may be co-precipitated with the said transition metal compound or which is used as a support for the said transition metal compound.

The oxides of magnesium and titanium, aluminum silicate, magnesium carbonate, and magnesium chloride, for example, may be mentioned as mineral compounds used to advantage as the support.

In this technique of a supported catalyst, the properties of the support on the one hand and the process of preparation of the catalyst (deposition of the transition metal compound) on the other hand, have a very great importance for the properties of the said catalyst.

The present invention relates to a supported catalyst, the support consisting essentially of a magnesium chloride having specific properties and the catalyst being a compound of a metal belonging to Groups IV, V and VI of the Periodic Table of Elements, and in particular a titanium compound, known for its catalytic properties in the polymerisation and copolymerisation of alpha-olefins.

The catalyst support consists of particles based essentially on magnesium chloride, these particles having the following characteristics:

the particles are of a spheroidal shape defined by the fact that, if D and d are the large and small axes of these particles, D/d is less than or equal to 1.3, the particles have a mean diameter by mass comprised between about 10 and 100 microns;

the particle size distribution of these particles is such that the ratio Dm:Dn of the mean diameter by mass, Dm, to the mean diameter by number, Dn, is less than or equal to 3.0, for example between 1.1 and 2.5; more particularly, the particle size distribution of these particles is very narrow and such that the ratio Dm:Dn is comprised between 1.5 and 2.5; furthermore there is a practically total absence of particles with a diameter greater than $2 \times Dm$ or less than $0.2 \times Dm$; furthermore the particle size distribution is such that more than 90% by weight of the particles is comprised within the range $Dm \pm 10\%$;

the surface of the particles may be slightly dented such as that of a raspberry, but is preferably very smooth;

the specific surface area of the particles is comprised between about 20 and 60 sq.m./g (BET);

the density of the particles is comprised between about 1.6 and 2.2;

the particles consist essentially of magnesium chloride and possibly a chlorinated compound of aluminium; the atomic ratio Cl:(Mg+3/2Al) is slightly less than 2; furthermore, the particles contain, in low proportions, products with a Mg—C bond and also an electron donor compound.

The supports thus defined may in particular be prepared by reacting an organo-magnesium compound with a chlorinated organic compound in the presence of an electron donor compound. As organomagnesium compound a product of the formula $R_1MgR_2$ may be chosen, or else an addition complex of the formula $R_1MgR_2 \cdot xAl(R_3)_3$, in which formulae $R_1$, $R_2$ and $R_3$ are identical or different alkyl radicals having 2 to 12 carbon atoms and x is comprised between 0.001 and 10, preferably between 0.01 and 2. As chlorinated organic compound an alkyl chloride is chosen of the formula $R_4Cl$ in which $R_4$ is a secondary or preferably a tertiary alkyl radical having 3 to 12 carbon atoms. The electron donor compound employed is an organic compound comprising at least one atom of oxygen, sulphur, nitrogen and/or phosphorus. It may be chosen from among a wide variety of products such as amines, amides, phosphines, sulphoxides, sulphones or ethers. Among the electron donor compounds one may select in particular an aliphatic ether-oxide of the formula $R_5\text{-}O\text{-}R_6$ in which $R_5$ and $R_6$ are identical or different alkyl radicals having 1 to 12 carbon atoms.

Moreover, the various reactants involved in the preparation of the supports as defined above must be used under the following conditions:

the molar ratio $R_4Cl:R_1MgR_2$ is comprised between 1.5 and 2.5 and preferably between 1.85 and 1.95;

the molar ratio $R_4Cl:R_1MgR_2 \cdot xAl(R_3)_3$ is comprised between $1.5(1+3/2x)$ and $2.5(1+3/2x)$, and preferably between $1.85(1+3/2x)$ and $1.95(1+3/2x)$;

the molar ratio between the electron donor compound and the organo-magnesium compound ($R_1MgR_2$ or $R_1MgR_2 \cdot xAl(R_3)_3$) is comprised between 0.01 and 2, and preferably comprised between 0.01 and 1;

the reaction between the organo-magnesium compound and the chlorinated organic compound takes place with agitation, in a liquid hydrocarbon, at a temperature comprised between 5° C. and 80° C., and in particular between 35° C. and 80° C.

The preparation of the catalysts from the supports thus defined is performed by precipitation on to the said supports of a compound of a transition metal of Groups IV, V and VI of the Periodic Table of Elements, known for its catalytic properties in respect of the polymerisation and copolymerisation of ethylene, and in particular of a titanium compound whose valency is less than 4. This precipitation may be carried out in accordance with known processes, but is advantageously performed according to the following process:

the reaction of reducing a titanium compound at its maximum valency, of the formula $Ti(OR_7)_{(4-n)}X_n$, in which $R_7$ is an alkyl group containing 2 to 6 carbon atoms, X is a chlorine or bromine atom and n is an integer or fraction from 1 to 4 inclusive, is performed by means of a reducing agent chosen from among organomagnesium compounds of the formula $R_8MgR_9$, in which $R_8$ and $R_9$ are identical or different alkyl groups containing 2 to 12 carbon atoms, organo-zinc compounds of the formula $Zn(R_{10})_{(2-y)}X_y$, in which $R_{10}$ is an alkyl group having 2 to 12 carbon atoms, X is chlorine or bromine and y is 0 or 1 or a fraction less than 1, and organo-aluminium compounds of the formula $Al(R_{11})_{(3-x)}X_x$, in which $R_{11}$ is an alkyl group having 2 to 12 carbon atoms, X is chlorine or bromine and x is 0 or an integer or fraction not greater than 2;

the said reduction reaction is carried out in the presence or absence of an electron donor compound chosen from among the organic compounds comprising at least one atom of oxygen, sulphur, nitrogen and/or phosphorus, such as, for example, the amines, amides, phosphines, sulphoxides, sulphones or ethers;

the relative molar quantities of the various compounds (support, titanium compounds, organo-magnesium or organo-zinc or organoaluminium compound, electron donor) are, by molar ratios, such that:

support:titanium compound is comprised between 1 and 50, preferably between 2.5 and 10;

organo-magnesium or organo-zinc or organo-aluminium compound:titanium compound is less than 3 and preferably between 0.5 and 1.5;

electron donor compound:titanium compound is comprised between 0 and 5, and preferably between 0.1 and 1.5.

The said reduction reaction can also be carried out in the presence of an aliphatic ether oxide of the formula $R_{12}$—O—$R_{13}$, in which $R_{12}$ and $R_{13}$ are identical or different alkyl groups with 1 to 12 carbon atoms. The relative quantities of the various compounds (support, $Ti(OR_7)_{(4-n)}X_n$, organomagnesium compound and/or organozinc compound and/or organoaluminium compound and ether-oxide) are, by molar ratios, such that:

Mg/Ti is comprised between 1 and 50, preferably between 2.5 and 10;

Al and/or Zn/Ti is comprised between 0 and 3, preferably between 0.5 and 1.5;

Ether/Ti is comprised between 0 and 5, preferably between 0.1 and 1.5.

The precipitation is performed at a temperature comprised between $-30°$ C. and $100°$ C. under agitation, in a liquid hydrocarbon medium.

The use of the reactants in this precipitation may be carried out in various ways. For example the reducing agent (organo-magnesium compound or organo-zinc compound or organo-aluminium compound) can be introduced gradually into the liquid hydrocarbon medium containing the magnesium chloride support and the titanium compound. It is also possible to introduce the reducing agent and the titanium compound gradually and simultaneously into the liquid hydrocarbon medium containing the magnesium chloride support. However, it is generally preferable to introduce the titanium compound gradually into the liquid hydrocarbon medium containing the magnesium chloride support and the reducing agent.

The catalysts obtained according to the present invention occur in the form of a powder, generally brownish-red in colour, consisting of particles whose physico-chemical properties such as spheroidal shape, surface appearance, mean diameter by mass and particle size distribution defined by the ratio Dm:Dn, are more or less identical to those of the magnesium chloride support particles from which they originated.

The catalysts according to the invention may be used to polymerise or copolymerise ethylene, by using known techniques of polymerisation in suspension in a liquid hydrocarbon medium, or in the dry state, for example in a fluidised bed, after evaporating off the liquid hydrocarbon medium in which the catalyst has been prepared. In all cases the polymerisation or copolymerisation is performed using an organo-metallic co-catalyst, preferably an organo-aluminium compound, the said co-catalyst being employed in a quantity such that the Al:Ti atomic ratios are comprised between 0.1 and 50.

However, and this is another feature of the present invention, it has been found that the catalysts described above may advantageously be employed after undergoing prepolymerisation. This prepolymerisation, which leads to particles whose dimensions and shapes are more or less homothetic to (i.e. reflecting the shape of) those of the initial catalyst, consists in placing the catalyst and co-catalyst in contact with one or more alpha-olefins and in particular with ethylene; the prepolymerisation may advantageously be achieved in two stages as described above. The catalytic products obtained are of special interest when they are used for the polymerisation or copolymerisation of ethylene in a fluidised bed, for these products possess dimensions, abrasion resistance and a reactivity which can be adapted to this mode of polymerisation.

The commencement of the prepolymerisation reaction (or the first stage of this reaction when one is operating in two distinct stages) is perforce performed in suspension in an inert liquid medium.

This first prepolymerisation stage is continued until each particle of catalyst comprises from 0.1 to 10 g of polyethylene or ethylene copolymer per gramme-milliatom of titanium present in the catalyst. The prepolymerisation may then be continued either in suspension or in a liquid hydrocarbon medium, or in the dry state; generally it may be continued—whilst retaining a suitable activity of the catalyst—until each particle of catalyst comprises 10 to 500 g of polyethylene or ethylene copolymer per gramme-milliatom of titanium present in the catalyst.

It is important to note that by using the support and the catalyst according to the invention, the development of each particle is effected in accordance with dimensions homothetic to those of the particle of the initial support; the result is that the polymer or copolymer of ethylene obtained occurs in the form of particles with a spheroidal shape and having the same particle size distribution as the initial support.

Method for determining mean diameters by mass (Dm) and by number (Dn) of the support particles of magnesium chloride or of catalyst According to the invention, the mean diameters by mass (Dm) and by number (Dn) of the support particles of magnesium chloride or of catalyst are measured on the basis of microscope examinations, by means of the OPTOMAX image analyser (Micro-Measurements Ltd, Great Britain). The measuring principle consists in obtaining from the experimental study by optical microscopy of a population of particles a table of absolute frequencies giving the number ($n_i$) of particles belonging to each category (i) of diameters, each category (i) being characterised by an intermediate diameter ($d_i$), comprised between the limits of the said category. According to the French Norm NF X 11-630 of June 1981 Dm and Dn are provided by the following formulae:

mean diameter by mass:

$$Dm = \frac{\Sigma\ ni(di)^3 di}{\Sigma\ ni(di)^3}$$

mean diameter by number:

$$Dn = \frac{\Sigma \, ni \cdot di}{\Sigma \, ni}$$

The ratio Dm:Dn characterises the particle size distribution; it is sometimes known as the "width of particle size distribution".

Measuring with the OPTOMAX image analyser is performed by means of an inverted microscope which makes it possible to examine suspensions of magnesium chloride particles or of catalyst particles at an enlargement comprised between 16× and 200×. A television camera picks up the images given by the inverted microscope and transmits them to a computer which analyses the images line by line and dot by dot on each line, in order to determine the dimensions or diameters of the particles, and then to classify them.

The following non-restrictive examples illustrate the invention.

EXAMPLE 1

Preparation of the support

Into a 5-liter stainless steel reactor agitated at 750 revolutions per minute and containing 800 ml of n-hexane, there are introduced at ambient temperature (20° C.) and under a blanket of nitrogen, 1725 ml of a solution of butyloctyl-magnesium in n-hexane, containing 1500 gramme-milliatoms of magnesium and 153 ml (750 millimoles) of di-isoamyl ether. The reactor is then heated to 50° C. and over a period of 3 hours 322 ml of t-butyl chloride (or 2925 millimoles) are poured in gradually.

At the end of this addition, the suspension is maintained at 50° C. for 3 hours and the precipitate obtained is washed with n-hexane.

The solid product (A) obtained has the following composition per gramme-atom of magnesium: 1.97 gramme-atoms of chlorine, 0.03 gramme-equivalents of Mg-C and 0.02 mole of di-isoamyl ether. On examination under the microscope it could be seen that the solid product (A) occurred in the form of a powder made up of spheroidal particles (the mean ratio between the large and small axes, D:d, of the particles is equal to 1.2), having a narrow particle size distribution, as defined by the ratio Dm:Dn=1.1, where Dm=52 microns; it was also noted that more than 90% by weight of the particles have mean diameters comprised between 47 and 57 microns; the density of the product is equal to 1.9 and its specific surface area to 38 m$^2$/g (BET); the surface of the particles is perfectly smooth.

EXAMPLE 2

As catalyst support the product (A) prepared in Example 1 above is used.

Production of the catalyst

To 3000 ml of suspension in n-hexane of product (A) containing 1450 millimoles of MgCl$_2$ there is added with agitation 82 ml di-isoamyl ether and 400 ml of a 1.2 molar solution in n-hexane (or 480 millimoles) of diethyl aluminium chloride. The reactor is brought to 50° C. and over 2 hours 650 ml of a 0.6 molar solution in n-hexane (or 390 millimoles) of di-n-propoxytitanium dichloride are added gradually. At the end of this addition, the temperature is brought to 80° C. and this is maintained for 2 hours. The catalyst obtained is then washed 5 times with n-hexane to give the catalyst solid ready for use (B). Analysis of the product (B) shows that it contains per gramme-atom of total titanium: 0.94 gramme-atom of trivalent titanium; 0.06 gramme-atom of tetravalent titanium; 3.85 gramme-atoms of magnesium; 9.97 gramme-atoms of chlorine; 0.20 gramme-atom of aluminium; and 0.11 gramme-molecule of di-isoamyl ether. The catalyst thus defined is a brown powder consisting of particles of spheroidal shape having a narrow particle size distribution such that more than 90% of the particles have a mean diameter comprised between 50 and 60 microns, with Dm=55 microns; it is found furthermore that the ratio Dm/Dn of the catalyst particles is equal to 1.2; the surface of the catalyst particles is perfectly smooth.

Prepolymerisation (first stage)

Into a 5-liter stainless steel reactor, equipped with an agitator rotating at 750 revolutions per minute and containing 2 liters of n-hexane heated to 50° C., there is introduced under a blanket of nitrogen 100 millimoles of tri-n-octyl aluminium (TnOA) and a suspension of the catalyst (B) in hexane containing 500 gramme milliatoms of titanium [or 295 g of (B)]. The reactor is heated to 60° C. and ethylene is introduced at a constant rate equal to 167 g per hour, over 3 hours. At the end of the reaction the whole is decanted into a rotary evaporator under vacuum; in this way 820 g of dry powder (C) of a prepolymer of a light-brown colour, consisting of particles with a mean diameter by mass equal to 66 microns and a narrow particle size distribution is obtained. The powder (C) is preserved under nitrogen.

Prepolymerisation (second stage)

Into a reactor with a fluidised bed of 15 cm diameter, operating with a gas speed of 10 cm/sec under partial pressures of 0.8 MPa of nitrogen, 0.1 MPa of hydrogen and 0.1 MPa of ethylene, every 6 minutes 11 g of the powder (C) is injected and 25 g/hr of pure TnOA are injected continuously in the bottom half of the bed maintained at 70° C. During a series of withdrawals were collected 4 kg/hr of a slightly beige-tinted powder which showed, for a residence time of half an hour in the reactor, a content of 800 ppm of titanium, a mean diameter by mass of 260 microns and an apparent voluminal mass of 0.41 g/cm$^3$; the pre-polymer (D) obtained in this way is also preserved under nitrogen.

Polymerisation of ethylene

Into a fluidised bed reactor with a diameter of 46 cm operating with a rising gas propelled at a speed of 45 cm/sec, and under partial pressures of 1.2 MPa of hydrogen and 0.8 MPa of ethylene, there is injected in sequence 0.5 kg/hr of pre-polymer (D) into the bed maintained at 85° C. During a series of withdrawals there are collected 25 kg/hr of a white powder shows, for a residence time of 6 hours in the reactor, a titanium content of 16 ppm, a mean diameter by mass of 940 microns, a narrow particle size distribution and an apparent voluminal mass of 0.47 g/cm$^3$; moreover the melt index at 2.16 kg at 190° C. is 6 g/10 mins, and the molecular weight distribution, Mw:Mn, measured by GPC, is equal to 4.0.

EXAMPLE 3

As support (A) a powder based on magnesium chloride is used, consisting of spheroidal particles having a narrow particle size distribution such that more than 90% by weight of the particles have a mean diameter comprised between 29 and 35 microns, with Dm=32 microns; this powder has a density equal to 1.85 and a specific surface area equal to 41 m²/g (BET).

Catalyst Production

This is identical to that of Example 2. Analysis of the product (B) obtained gave per gramme atom of total titanium: 0.96 gramme atom of trivalent titanium; 0.04 gramme atom of tetravalent titanium; 3.60 gramme atoms of magnesium; 9.40 gramme atoms of chlorine; 0.13 gramme atoms of aluminium; and 0.07 mole of di-isoamyl ether. The catalyst (B) is a brown powder consisting of spheroidal particles with a narrow particle size distribution such that more than 90% by weight of the particles have a mean diameter comprised between 30 and 36 microns, with Dm=33 microns; the surface of the catalyst particles is slightly dented, of the "raspberry" type.

Prepolymerisation (first stage)

This was identical to that of Example 2. 807 g of dry powder (C) of a prepolymer were obtained with a mean diameter by mass equal to 40 microns, and a narrow particle size distribution.

Pre-copolymerisation (second stage)

Into a fluidised bed reactor with a diameter of 15 cm, operating with a rising gas propelled at a speed of 10 cm/sec, and under partial pressures of 1 MPa of nitrogen, 0.04 MPa of hydrogen, 0.05 MPa of butene-1 and 0.13 MPa of ethylene, every 6 minutes 6.5 g of the powder (C) and continuously 26.4 g per hour of TnOA were injected into the bed maintained at 70° C. 4 kg/hr of powder (D) of a pre-copolymer of ethylene were withdrawn which contained 480 ppm titanium, after a residence time of half an hour in the reactor. This powder has a mean diameter by mass of 190 microns and an apparent voluminal mass of 0.36 g/cm³.

Copolymerisation of the ethylene and butene-1

Into a fluidised bed reactor with a diameter of 46 cm, operating with a rising gas propelled at a speed of 45 cm/sec, and under partial pressures of 0.7 MPa of nitrogen, 0.2 MPa of hydrogen, 0.26 MPa of butene-1 and 0.84 MPa of ethylene, 0.44 kg/hr of the pre-copolymer (D) were injected into the bed maintained at 80° C. On withdrawal 21 kg/hr were collected of an ethylene copolymer powder showing, for a residence time of 6 hours in the reactor, a titanium content equal to 10 ppm, a mean diameter mass of 720 microns and a narrow particle size distribution; moreover, the melt index of the copolymer under 2.16 kg at 190° C. is 1 g/10 minutes; at 20° C. its density is equal to 0.917 and its bending strength is 21 MPa. Its apparent voluminal mass is equal to 0.40 g/cm³, a figure which is lower than that for Example 2 because of the "raspberry"-like surface of the copolymer particles which reflect the shape of the catalyst particles.

EXAMPLE 4

As support (A) a powder based on magnesium chloride is used, consisting of spheroidal particles having a narrow particle size distribution such that more than 90% by weight of the particles have a mean diameter comprised between 21 and 25 microns, with Dm=23 microns; this powder has a density equal to 2.1 and a specific surface area equal to 46 m²/g (BET).

Catalyst Production

This is identical to that of Example 2. Analysis of the product (B) obtained gave per gramme atom of total titanium: 0.94 gramme atom of trivalent titanium; 0.06 gramme atom of tetravalent titanium; 3.80 gramme atoms of magnesium; 9.84 gramme atoms of chlorine; 0.16 gramme atoms of aluminium; and 0.08 mole of di-isoamyl ether. The catalyst (B) is a brown powder composed of spheroidal particles, having a narrow particle size distribution such that more than 90% by weight of the particles have a mean diameter comprised between 21 and 25 microns, with Dm=23 microns.

Prepolymerisation (first stage)

This is identical to that of Example 2. 817 g of dry powder (C) are obtained of a prepolymer having a mean diameter by mass equal to 28 microns and a narrow particle size distribution.

Prepolymerisation (second stage)

Into a fluidised bed reactor with a diameter of 15 cm, operating with a rising gas propelled at a speed of 10 cm/sec and under partial pressures of 1.8 MPa of nitrogen, 0.1 MPa of hydrogen and 0.1 MPa of ethylene, every 5 minutes 2.2 g of powder (C) were injected and 28.4 g/hr of TnOA were injected continuously into the bottom half of the bed maintained at 70° C. The prepolymer powder (D) collected on withdrawal at the rate of 4 kg per hour showed, for a residence time of half an hour in the reactor, a titanium content equal to 190 ppm, a mean diameter by mass of 175 microns and an apparent voluminal mass of 0.40 g/cm³.

Polymerisation of ethylene

This is identical to Example 2. In this way a polyethylene is obtained having a titanium content equal to 4 ppm, with a mean diameter by mass of 640 microns, a very narrow particle size distribution and an apparent voluminal mass of 0.51 g/cm³; moreover, the melt index of the polymer under 2.16 kg at 190° C. is equal to 8 g/10 minutes.

EXAMPLE 5

As support (A) is used a powder based on magnesium chloride, consisting of spheroidal particles having a narrow particle size distribution, such that Dm:Dn=1.3, with Dm=32 microns; this powder contains less than 0.1% by weight of particles of diameter less than 5 microns; it has a density equal to 1.85 and a specific surface area equal to 41 m²/g (BET). The surface of the particles is slightly dented, of the "raspberry" type.

Preparation of Catalyst

This is identical to that of Example 2. The analysis of the catalyst (B) obtained gives per gramme-atom of total titanium: 0.96 gramme-atom of trivalent titanium, 0.04 gramme-atom of tetravalent titanium, 3.60 gramme-atoms of magnesium, 9.40 gramme-atoms of chloride, 0.13 gramme-atom of aluminium and 0.07 moles of di-isoamyl ether. The catalyst (B) is a brown powder composed of spheroidal particles, having a particle size distribution such that Dm:Dn=1.3 with Dm=33 microns; the surface of the catalyst particles is furthermore of the "raspberry" type.

Prepolymerisation (first stage)

This is identical to that of Example 2. There are obtained 810 g of a dry powder (C) of a prepolymer, having a mean diameter by mass equal to 40 microns and a narrow particle size distribution.

Pre-copolymerisation (second stage)

Into a fluidised bed reactor with a diameter of 15 cm, operating with a rising gas propelled at a speed of 10 cm/sec, and under partial pressures of 1 MPa of nitrogen, 0.04 MPa of hydrogen, 0.05 MPa of butene-1, and 0.13 MPa of ethylene, are introduced every six minutes, 6.5 g of the powder (C) and continuously 26.4 g per hour of TnOA into the bed maintained at 70° C. 4 Kg per hour were withdrawn of powder (D) of a pre-copolymer of ethylene having a titanium content of 480 ppm, for a residence time of ½ hour in the reactor. This powder has a mean diameter by mass of 190 microns and an apparent voluminal mass of 0.36 g/cm$^3$.

Copolymerisation of Ethylene and Butene-1

Into a fluidised bed reactor with a diameter of 46 cm operating with a rising gas propelled at a speed of 45 cm/sec, and under partial pressures of 0.7 MPa of nitrogen, 0.2 MPa of hydrogen, 0.3 MPa of butene-1 and 0.8 MPa of ethylene, 0.44 Kg/hour of pre-copolymer (D) are introduced into the bed maintained at 80° C. On withdrawal, there are collected 21 Kg/hour of a powder of ethylene copolymer which showed, for a residence time in the reactor of 6 hours, a content of titanium equal to 10 ppm, a mean diameter by mass of 720 microns and a narrow particle size distribution; furthermore, the melt index of the copolymer under 2.16 Kg at 190° C. is equal to 1.5 g/10 minutes and the molecular weight distribution, Mw/Mn, is equal to 4.5; its density at 20° C. is equal to 0.918 and its bending strength is 21 MPa. Its apparent voluminal mass is equal to 0.40 g/cm$^3$.

EXAMPLE 6

There is used as (A) a powder based on magnesium chloride, composed of spheroidal particles having a narrow particle size distribution, such that Dm:Dn=1.5 with Dm=23 microns; this powder contains less than 0.05% by weight of particles of diameter less than 6 microns; it shows a density equal to 1.9 and a specific surface area equal to 42 m$^2$/g (BET); the surface of the particles is very smooth.

Preparation of Catalyst

This is identical to that of Example 2. The analysis of the catalyst (B) obtained per gramme-atom of total titanium is: 0.95 gramme-atom of trivalent titanium, 0.05 gramme-atom of tetravalent titanium, 3.8 gramme-atoms of magnesium, 9.8 gramme-atoms of chlorine, 0.15 gramme-atom of aluminium and 0.09 mole of di-isoamyl ether. The catalyst (B) is a brown powder consisting of spheroidal particles, having a particle size distribution such that Dm:Dn equals 1.5 with Dm=30 microns; the catalyst particles have a surface as smooth as the initial support.

Prepolymerisation (first stage)

This is identical to that of Example 2. There are obtained 820 g of dry powder (C) of a prepolymer having a mean diameter by mass equal to 36 microns and a narrow particle size distribution.

Prepolymerisation (second stage)

Into a fluidised bed reactor with a diameter of 15 cm operating with a rising gas propelled at a speed of 10 cm/sec and under partial pressures of 1.8 MPa of nitrogen, 0.1 MPa of hydrogen, and 0.1 MPa of ethylene are introduced every five minutes, 2.1 g of powder (C) and continuously, 28.5 g/hour of TnOA into the bottom half of the bed maintained at 70° C. The powder (D) of prepolymer, recovered on withdrawal at a rate of 4 kg/hour shows, for a residence time of ½ hour in the reactor, a titanium content equal to 185 ppm, a mean diameter by mass of 225 microns and an apparent voluminal mass of 0.42 g/cm$^3$.

Polymerisation of Ethylene

This is identical to that of Example 2. There are obtained thus a polyethylene, of titanium content equal to 5 ppm, having a mean diameter by mass of 810 microns, a very narrow particle size distribution and an apparent voluminal mass of 0.51 g/m$^3$; moreover, the melt index of the polymer under 2.16 kg at 190° C. is equal to 7 g/10 minutes and the molecular weight distribution, Mw:Mn, is equal to 4.3.

EXAMPLE 7

There is used as support (A) a powder on magnesium chloride, composed of spheroidal particles having a narrow particle size distribution, such that Dm:Dn=2.5 with Dm=20 microns; this powder contains less than 0.05% by weight of particles of diameter less than 4 microns; it shows a density equal to 1.9 and a specific surface area equal to 46 m$^2$/g (BET); the surface of the particles is smooth.

Preparation of Catalyst

This is identical to that of Example 2. The analysis of the catalyst (B) obtained gives per gramme-atom of total titanium: 0.94 gramme-atom of trivalent titanium, 0.06 gramme-atom of tetravalent titanium, 3.80 gramme-atoms of magnesium, 9.85 gramme-atoms of chlorine, 0.16 gramme atom of aluminium and 0.08 mole of di-isoamyl ether. The catalyst (B) is a brown powder consisting of spheroidal particles having a particle size distribution such that Dm:Dn=2.5, with Dm=20 microns; the catalyst particles have a surface as smooth as the initial support.

Prepolymerisation (first stage)

This is identical to that of Example 2. There are obtained 815 g of dry powder (C) of a prepolymer having a mean diameter by mass equal to 24 microns and a narrow particle size distribution.

Prepolymerisation (second stage)

Into a fluidised bed reactor with a diameter of 15 cm, operating with a rising gas propelled at a speed of 10 cm/sec and under partial pressures of 1.8 MPa of nitrogen, 0.1 MPa of hydrogen, and 0.1 MPa of ethylene, there are introduced every 5 minutes 2.2 g of powder (C) and continuously, 28.4 g/hour of TnOA into the bottom half of the bed maintained at 70° C. The prepolymer powder (D), recovered on withdrawal at a rate of 4 Kg/hour showed, for a reaction time of half an hour in the reactor, a titanium content equal to 190 ppm, a mean diameter by mass of 150 microns and an apparent voluminal mass of 0.44 g/cm$^3$.

Polymerisation of Ethylene

This is identical to that of Example 2. There are obtained in this way a polyethylene, of titanium content equal to 4 ppm, having a mean diameter by mass of 550 microns, a very narrow particle size distribution and an apparent voluminal mass of 0.53 g/cm$^3$; moreover, the melt index of the polymer under 2.16 Kg at 190° C. is equal to 8 g/10 minutes and the molecular weight distribution, Mw:Mn, is equal to 4.1.

EXAMPLE 8

The support (A) prepared as in Example 4 is used.

Catalyst Production

To 3000 ml of suspension of the support (A) containing 1450 millimoles of MgCl$_2$, there was added with agitation 8.2 ml of diisoamyl ether and 270 ml of a 1.2 molar solution in n-hexane of diethyl-aluminium chloride. The reaction medium was heated to 30° C., and over 2 hours 650 ml of a 0.6 molar solution of titanium tetrachloride in n-hexane were added gradually. At the end of this introduction the medium was heated to 80° C. and maintained with agitation at this temperature for 2 hours. The catalyst obtained was then washed five times with n-hexane to give the catalyst solid ready for use (B).

Analysis of the catalyst (B) shows that it contains per gramme atom of total titanium: 0.97 gramme atom of trivalent titanium; 0.03 gramme atom of tetravalent titanium; 3.7 gramme atoms of magnesium; 11.2 gramme atoms of chlorine; 0.33 gramme atom of aluminium; and 0.01 mole of di-isoamyl ether.

The catalyst thus defined is a brown powder consisting of spheroidal particles having a narrow particle size distribution such that more than 90% by weight of the particles have a mean diameter comprised between 21 and 25 microns, with Dm=23 microns.

Prepolymerisation in suspension

Into a 5-liter stainless steel reactor there was introduced 3000 ml of n-hexane heated to 70° C. with agitation (750 revolutions per minute), 19 ml of a 1.14 molar solution in n-hexane of tri-n-octyl aluminium, 16.7 ml of a suspension of the catalyst (B) in n-hexane containing 0.13 gramme-atom of titanium per liter and a volume of 1500 ml of hydrogen, measured under normal conditions. Ethylene was then introduced at a throughput of 180 g/hr for 3 hours, with addition of a volume of 1500 ml of hydrogen, measured under normal conditions, after one and a half hours of reaction. The prepolymer obtained was dried at 70° C. under nitrogen, the quantity recovered being 530 g. The prepolymer powder has a narrow particle size distribution and a mean diameter by mass equal to 180 microns. Its apparent voluminal mass is 0.36 g/cm$^3$.

Polymerisation of ethylene

This is identical to that of Example 2, except for the fact of using the prepolymer prepared in Example 8 and that the hydrogen and ethylene pressures are equal to 0.6 MPa and 1.4 MPa respectively. The prepolymer is introduced into the fluidised bed at a rate of 0.470 kg/hr. and the production is 30 kg/hr. of polyethylene. The polymer obtained has a mean diameter by mass of 700 microns, an apparent voluminal mass of 0.44 g/cm$^3$, a melt index under 5 kg at 190° C. of 1 g/10 minutes and a molecular weight distribution, Mw:Mn, equal to 10. Its titanium content is equal to 3 ppm.

EXAMPLE 9

Catalyst (B) prepared as in Example 4 was used and the polymerisation of ethylene was carried out under the following conditions:

Into a 5-liter stainless steel reactor provided with an agitator there was introduced under nitrogen at ambient temperature (20° C.) 2 liters of n-hexane which was heated to 80° C., then 4 millimoles of tri-n-octyl aluminium and a quantity of catalyst (B) prepared as in Example 4 containing 0.16 gramme-milliatom of titanium.

The reactor was then closed and hydrogen was introduced up to a pressure of 0.10 MPa and ethylene at a throughput of 160 g/hr for 3 hours.

After cooling and evaporation of the n-hexane, approximately 480 g of polyethylene powder were collected, having a titanium content equal to 16 ppm, a mean diameter by mass equal to 400 microns, a narrow particle size distribution and an apparent voluminal mass equal to 0.4 g/cm$^3$.

We claim:

1. Catalysts which can be used for the polymerisation and copolymerisation of ethylene, characterised in that they comprise a support essentially based on magnesium chloride, or magnesium chloride and an aluminium chloride derivative, occurring in the form of spheroidal particles having a mean diameter by mass comprised between 10 and 100 microns and a particle size distribution such that the ratio of the mean diameter by mass, Dm, to the mean diameter by number, Dn, is less than or equal to 3.0, on which support there is precipitated a compound of a transition metal of Groups IV, V and VI of the Periodic Table of Elements, known for its catalytic properties in respect of the polymerisation and copolymerisation of ethylene.

2. Catalysts in accordance with claim 1, characterised in that the support has a particle size distribution such that the ratio Dm:Dn of the mean diameter by mass to the mean diameter by number of the particles is comprised between 1.1 and 2.5.

3. Catalysts in accordance with claim 1, characterised in that the support has a particle size distribution such that the ratio Dm:Dn is comprised between 1.1 and 1.5.

4. Catalysts in accordance with claim 1, characterised in that the support has a particle size distribution such that more than 90% by weight of the particles of each batch are comprised within the range Dm±10%.

5. Catalysts in accordance with claim 1, characterised in that the support contains products comprising at least one Mg—C bond and an electron donor compound, and in that its density is comprised between 1.6 and 2.2

6. Catalysts in accordance with claim 1, characterised in that the support has a specific surface area comprised between 20 and 60 m$^2$/g (BET), and has a smooth surface.

7. Catalysts in accordance with claim 1, characterised in that the precipitation of a titanium compound is carried out on the support.

8. Process for the preparation of catalysts defined in claim 7, characterised in that:

the precipitation is achieved by the reaction of reduction of a titanium compound at maximum valency of the formula Ti(OR$_7$)$_{(4-n)}$X$_n$ in which R$_7$ is an alkyl group containing 2 to 6 carbon atoms, X is a chlorine or bromine atom, and n is an integer or fraction from 1 to 4 inclusive, by means of a reducing agent chosen from among the organomagnesium compounds of the formula $R_8MgR_9$ in which $R_8$ and $R_9$ are identical or different alkyl groups containing from 2 to 12 carbon atoms, organo-zinc compounds of the formula $Zn(R_{10})_{(2-y)}X_y$ in which $R_{10}$ is an alkyl group having 2 to 12 carbon atoms, X is chlorine or bromine and y equals 0 or 1 or a fraction less than 1, and organoaluminium compounds of the formula $Al(R_{11})_{(3-x)}X_x$ in which $R_{11}$ is an alkyl group having 2 to 12 carbon atoms, X is chlorine or bromine and x is 0 or an integer or fraction not greater than 2;

the said reaction of reduction is performed in the presence or absence of an electron donor compound chosen from among organic compounds comprising at least one atom of oxygen, sulphur, nitrogen and/or phosphorus;

the relative quantities of the various compounds (support, titanium compound, organo-magnesium or organo-zinc or organo-aluminium compound, electron donor) are, by molar ratios, such that:

support:titanium compound is comprised between 1 and 50, organo-magnesium or organo-zinc or organo-aluminium compound:titanium compound is less than 3, electron donor compound:titanium compound is comprised between 0 and 5.

9. Process for the preparation of catalysts defined in claim 7, characterised in that:

the precipitation is achieved by the reaction of reduction of a titanium compound at maximum valency of the formula $Ti(OR_7)_{(4-n)}X_n$ in which $R_7$ is an alkyl group containing 2 to 6 carbon atoms, X is a chlorine or bromine atom, and n is an integer or fraction from 1 to 4 inclusive, by means of a reducing agent chosen from among the organo-magnesium compounds of the formula $R_8MgR_9$ in which $R_8$ and $R_9$ are identical or different alkyl groups containing from 2 to 12 carbon atoms, organo-zinc compounds of the formula $Zn(R_{10})_{(2-y)}X_y$ in which $R_{10}$ is an alkyl group having 2 to 12 carbon atoms, X is chlorine or bromine and y equals 0 or 1 or a fraction less than 1, and organoaluminium compounds of the formula $Al(R_{11})_{(3-x)}X_x$ in which $R_{11}$ is an alkyl group having 2 to 12 carbon atoms, X is chlorine or bromine and x is 0 or an integer or fraction not greater than 2;

the said reaction of reduction is performed in the presence or absence of an aliphatic ether-oxide of the formula $R_{12}OR_{13}$ in which $R_{12}$ and $R_{13}$ are identical or different alkyl groups having 1 to 12 carbon atoms;

the relative quantities of the various compounds (support, $Ti(OR_7)_{(4-n)}X_n$, organo-magnesium and/or organo-zinc and/or organo-aluminium compound, and ether-oxide) are, by molar ratios, such that:

Mg:Ti is comprised between 1 and 50,

Al and/or Zn/Ti is comprised between 0 and 3, ether/Ti is comprised between 0 and 5.

10. Process for the preparation of catalysts defined in claim 8, characterised in that:

the relative quantities of the various compounds (support, titanium compound, organo-magnesium or organo-zinc or organo-aluminium compound, electron donor) are, by molar ratios, such that:

support:titanium compound is comprised between 2.5 and 10; organo-magnesium or organo-zinc or organo-aluminium compound: titanium compound is comprised between 0.5 and 1.5; and electron donor compound:titanium compound is comprised between 0.1 and 1.5.

11. Process for the preparation of catalysts defined in claim 9, characterised in that:

the relative quantities of the various compounds (support, $Ti(OR_7)_{(4-n)}X_n$, organo-magnesium and/or organo-zinc and/or organo-aluminium compound, and ether-oxide) are, by molar ratios, such that:

Mg:Ti is comprised between 2.5 and 10;

Al and/or Zn/Ti is comprised between 0.5 and 1.5;

ether/Ti is comprised between 0.1 and 1.5.

12. Catalysts in accordance with claim 1, characterised in that the support contains products comprising at least one Mg—C bond, and in that its density is comprised between 1.6 and 2.2.

13. Catalysts which can be used for the polymerisation and copolymerisation of ethylene, characterised in that they comprise a support essentially based on magnesium chloride, or magnesium chloride and an aluminum chloride derivative, occurring in the form of spheroidal particles having a mean diameter by mass, Dm, comprised between 10 and 100 microns and a particle size distribution such that more than 90% by weight of the particles of each batch are comprised within the range Dm±10%, on which support there is precipitated a compound of a transition metal of Groups IV, V and VI of the Periodic Table of Elements, known for its catalytic properties in respect of the polymerisation and copolymerisation of ethylene.

* * * * *

UNITED STATES PATENT AND TRADEMARK OFFICE
CERTIFICATE OF CORRECTION

PATENT NO. : 4,497,904

DATED : February 5, 1985

INVENTOR(S) : Alain Blaya, et al

It is certified that error appears in the above-identified patent and that said Letters Patent is hereby corrected as shown below:

Column 1, line 53, after "between" change "1.5 and 2.5" to --1.1 and 1.5--.

Signed and Sealed this

Seventeenth Day of September 1985

[SEAL]

Attest:

DONALD J. QUIGG

Attesting Officer

Commissioner of Patents and
Trademarks—Designate